Patented Jan. 1, 1935

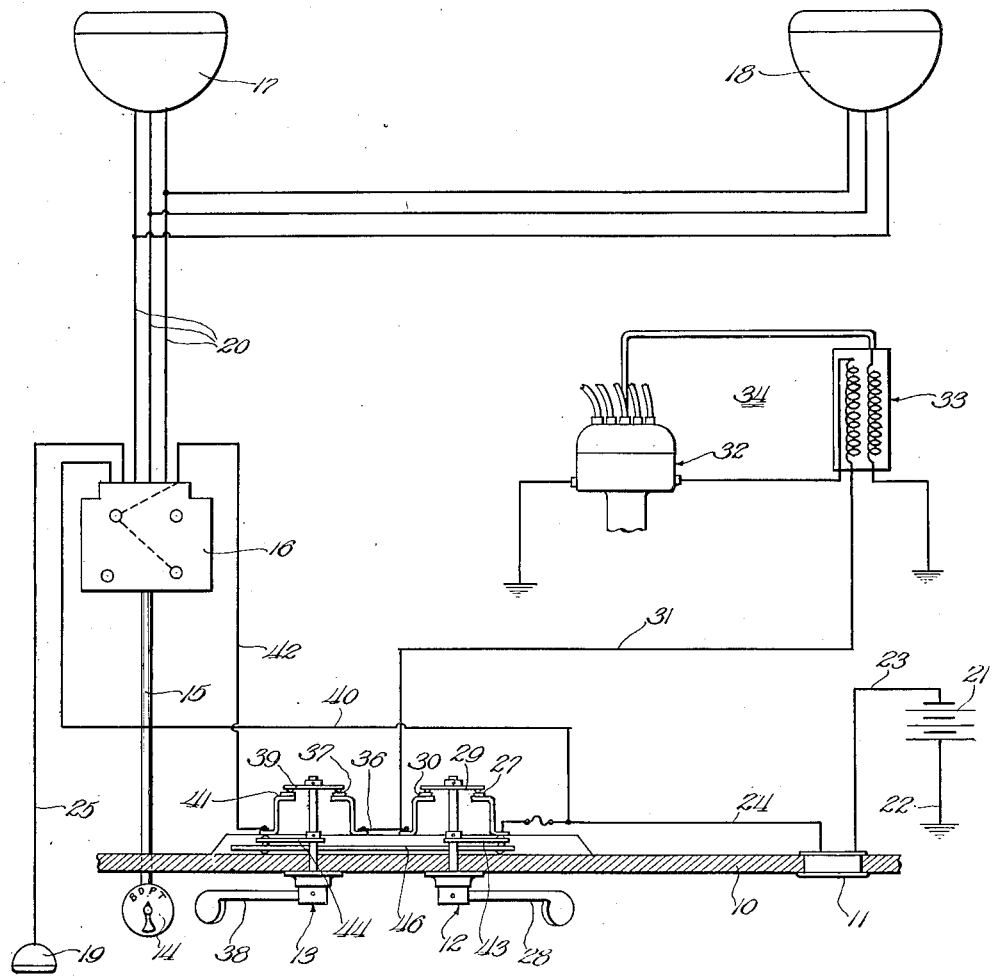

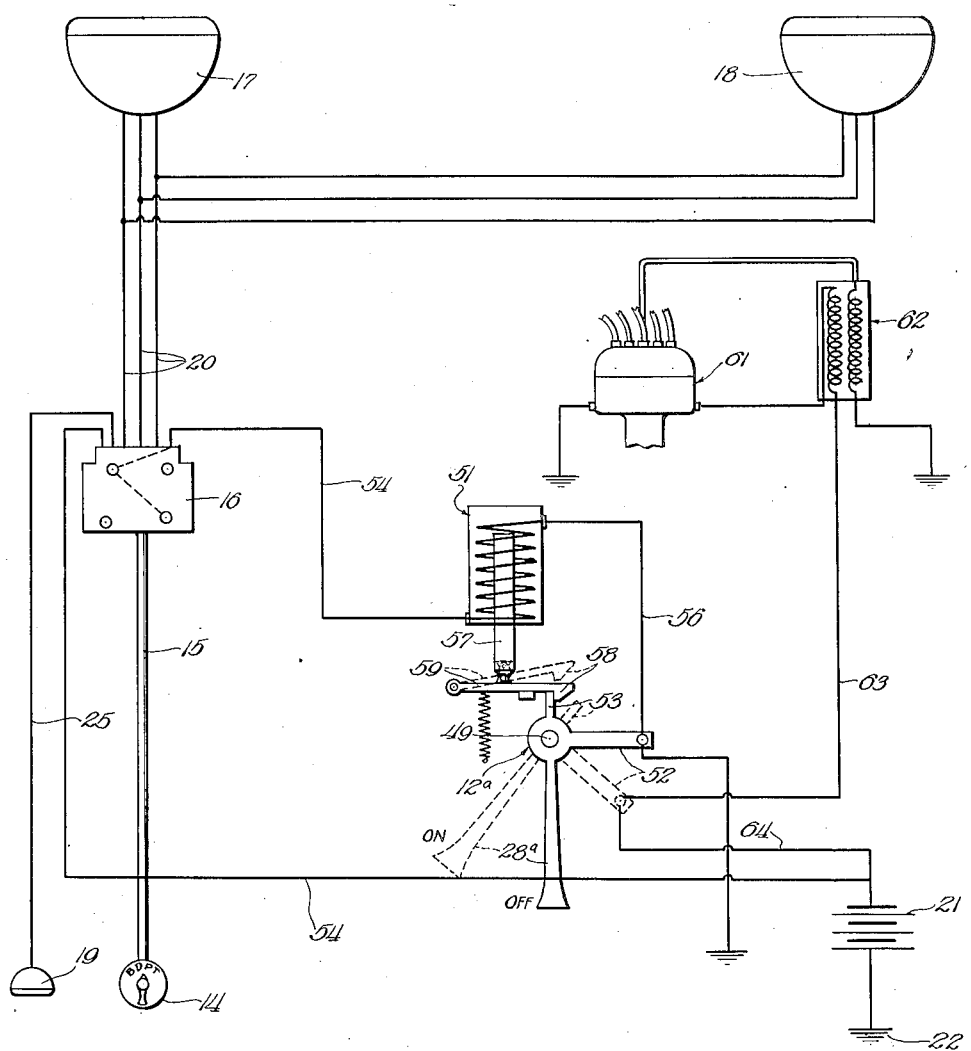

1,986,114

UNITED STATES PATENT OFFICE 1,986,114

CONTROL SYSTEM

James S. Manton, Oak Park, Ill.

Application April 6, 1931, Serial No. 528,226
Renewed September 29, 1933

12 Claims. (Cl. 171—97)

This invention relates to lighting control systems and more particularly to an interlocking lighting and ignition control system more suitable for use in, but not solely adapted for, controlling automobile ignition and lighting circuits.

In automobiles and other self propelled vehicles it is customary to provide independent switching means for controlling the lighting system and the ignition system. In operating the vehicle during the day the operator, in starting his vehicle, turns on the ignition switch only and since the ignition switch and lighting switch are not interconnected in any way, the operator does not manipulate the lighting control switch in any manner. Because of this habit acquired during the daytime, and because the streets are usually well lighted and the operator is accustomed to drive with only "dim" lights, he is very likely to forget to turn on his lights when starting his car at night-time. This results in the very dangerous situation of operating a vehicle at night without lights, thus materially increasing the likelihood of accidents.

I have conceived of a means for avoiding this dangerous situation by causing the lights on the vehicle to be turned on every time the motor is started, thus preventing the operator from running without lights because he forgets to turn them on.

It is therefore a general object of the invention to provide means to cause the lights of a motor vehicle to be lighted whenever the vehicle is started.

Another object of the invention is to provide an interlocking lighting and ignition control system such that closing of the ignition switch will cause the lights of an automotive vehicle to be lighted.

Another object of the invention is to provide means to prevent closing of the ignition circuit unless the lighting circuit is closed.

Another object of the invention is to provide devices of the above character which shall be simple, reliable, compact and inexpensive.

Other and further features and objects of the invention will be more apparent to those skilled in the art upon a consideration of the accompanying drawings and following specification wherein is disclosed several exemplary embodiments of the invention, with the understanding, however, that such changes may be made therein as fall within the scope of the appended claims without departing from the spirit of the invention.

In said drawings:

Figure 1 is a diagrammatic representation of the lighting and ignition control systems of a motor vehicle in which a mechanical interlocking control device constructed according to my invention is incorporated;

Figure 2 is an elevational view of a portion of the dash of a motor vehicle showing the ignition and auxiliary light control switches in place and in the positions they occupy when the ignition and lights are both "on";

Figure 3 is a view in elevation of a portion of a motor vehicle dash with the ignition switch in the "off" position and the auxiliary lighting switch in the "on" position; and Figure 4 is a diagrammatic representation of the lighting and ignition systems of a motor vehicle in which an electrically actuated safety control device constructed according to my invention is incorporated.

Referring now to the drawings for a more complete disclosure of a control system embodying my invention and particularly to Figures 1, 2 and 3 there is shown at 10 the dash of a motor vehicle on which is mounted an ammeter 11, an ignition switch 12 and an auxiliary or safety lighting switch 13. A switch lever 14, for controlling a lighting control switch 16, which is used for controlling the direction and intensity of the light beams from the headlights and controlling dash lights, tail lights, parking lights, and so on, may be mounted upon the dash, the steering wheel, the floor or any other suitable position.

In the embodiment of the invention here shown the switch lever 14 used for controlling the lights is mounted on the steering column (not shown) and is connected by means of a rod 15 with the switching device 16 which is preferably mounted under the hood. The switch 16 is of the usual construction and is provided with suitable contacts and contacting fingers so that the switch lever 14 may be utilized to turn the lights on bright or dim and control the parking and tail lights.

Electric current for the ignition and lighting systems is furnished by means of a storage battery 21 in the usual manner, with one terminal of the battery grounded on the frame of the vehicle by a conductor 22 and the other connected by means of conductor 23 to a terminal of the ammeter 11. A conductor 24 connects the other terminal of the ammeter 11 with the contacts 27 of the ignition switch 12. When the switch lever 28 is in the "on" position, as indicated in Figure 2, the bridging member 29 connects the contacts 27 with the contacts 30 thus energizing the conductor 31 and connecting the circuit breaker 32 and the primary of the spark coil 33 of the ignition system, indicated generally by the number 34, with the battery, the circuit being completed to a ground connection of the circuit breaker.

A connection is made by means of a conductor 36 between the contacts 30 of switch 12 and the contacts 37 of auxiliary switch 13. When the switch lever 38 of the auxiliary lighting switch 13 is in the "on" position, a bridging member 39 makes electrical connection between the contacts 37 and the contacts 41 of the switch, thereby completing an electrical circuit, from the storage battery, through the ammeter 11, through the ignition switch 12, through the lighting switch 13, through the conductor 42 to the lighting control device 16 and to the headlights 17 and 18 and the tail light 19. It is to be noted at this time that the ignition switch 12 and the auxiliary lighting switch 13 are in series electrical relation so that the lights are energized through this auxiliary circuit only when both the switches are in the "on" position.

The lights are ordinarily energized and controlled by means of an electrical circuit comprising the headlights 17 and 18 and tail light 19, conductors 20 and 25, respectively, switch 16 and conductor 40, which is connected, by means of the conductor 24, to the ammeter 11 and battery 21. This circuit, which may be termed the main circuit, is preferably used to energize the "bright" or "dim" lights, "parking" lights and so on, as desired by the operator, while the auxiliary or "safety" circuit is preferably electrically connected to energize the "bright" headlights and the tail light.

Levers 43 and 44 are secured to the shafts of switches 12 and 13, respectively, in a position directly in back of the switch levers 28 and 38. An interlocking bar 46 is pivotally attached to the lower end of the lever 43 by means of a pin 47, and a pin 48 on the lever 44 engages a slot 49 in the other end of the bar 46. The slot 49 is so located in the bar 46 that when the ignition switch lever 28 is in the "off" position (Figure 3), the bar forces the lighting lever 38 to the "on" position. If the ignition lever 28 is then moved to the "on" position (Figure 2) the slot 49 in bar 46 permits the lever 38 to remain in the "on" position, or the lever 38 may be moved to the "off" position, as desired, inasmuch as the slot will permit movement of the pin 48 to the right when the ignition lever is in the "on" position.

The operation of the safety lighting control system is as follows:

Suppose the operator is driving his vehicle. The ignition switch will be in the "on" position and the lighting switch 13 may be in the "on" position or the "off" position, depending on whether or not the operator is using his lights. If the lighting switch is in the "off" position and the operator then stops his motor by turning the ignition switch to the "off" position, the bar 46 will force the lighting switch from the "off" position to the "on" position, as shown in Figure 3. Since the ignition switch and the lighting switch are in series relation, however, the lights will be "off". When the operator again starts his motor, he turns the ignition switch to the "on" position, thereby completing a circuit through the ignition switch and through the lighting switch to light the lights. If the lights are not needed, the operator may then turn the lighting switch 13 to the "off" position. If, because the vehicle is being operated in daylight, the operator forgets to turn the lighting switch to the "off" position, no great harm is done, since the only result is to discharge the storage battery in proportion to the amount of electrical energy consumed. If it is night and the lights are needed, they are on and forgetfullness of the operator will not operate to cause driving without lights.

In another embodiment of my invention, shown in Figure 4, I substitute electrically actuated interlocking means in place of the mechanical interlocking means shown in Figures 1, 2, and 3, inclusive. In this embodiment of the invention the lighting switch 13 is eliminated and a solenoid 51 substituted therefor. In the device shown in this figure the ignition switch arm 28a is attached to the shaft 49 of an ignition switch 12a in the same manner as the switch shown in Figure 1, but a bridging switch arm 52 is substituted for the bridging member 29 and a short lever arm or catch 53 is fastened to the shaft 49 back of the dashboard and in opposed relation to the arm 28a.

Electrical energy for lighting the headlights 17 and 18 and the tail light 19 is furnished directly to the lighting control switch 16 from the storage battery 21 through a conductor 54. If the lighting switch lever 14 is in any one of several positions in which the lighting circuits leading to the vehicle lights are energized, an electrical circuit is completed through the solenoid 51 and through the switch arm 52 to ground by means of conductors 54 and 56, providing the switch arm 28a is in the "off" position.

If none of the lights are burning, the conductor 54 is not energized and, therefore, the core 57 of the solenoid 51 is in the lower position and a catch 58 on a pivotally mounted arm 59 engages the arm 53 of the ignition switch to lock it to prevent it from being turned to the "on" position.

If the operator then turns his lights on, the conductor 54 is energized thus energizing the coils of the solenoid 51 and raising the core 57 to lift the arm 59, thus releasing the catch 58 from the arm 53 of the switch 28a. The switch may then be turned to the "on" position, as indicated by the dotted lines, to complete a circuit through the distributor breaker 61 and ignition coil 62 by way of the conductor 63, bridging switch arm 52 and conductor 64.

It may readily be understood that, with the safety device just described, if the operator attempts to start his car by turning on the ignition switch without turning on the lighting switch, turning of the switch is prevented by means of the catch or latch 58 on lever arm 59. As soon as the operator turns on the lights, however, the solenoid is energized, thus releasing the arm 53 and permitting turning on of the ignition. If, after turning the ignition switch arm 28a to the "on" position the operator wishes to turn his lights off, he may do so. It is apparent, therefore, that by utilizing my invention just described the operator of a motor vehicle is compelled to turn on his lights before starting the vehicle.

It is apparent that I have provided means to insure lighting of the lights of a motor vehicle whenever the vehicle is started, thus preventing the operator from running without lights because he forgets to turn them on. The devices are simple, reliable, compact and inexpensive.

Although I have described specific embodiments of my invention, it is apparent that modifications may be made by those skilled in the art. These modifications may be made without departing from the spirit and scope of the invention as set forth in the appended claims.

I claim as my invention:

1. In combination in a motor vehicle including a motor, an ignition circuit for the motor, a lighting circuit, and interlocking control means between the two circuits to cause the lighting circuit to be initially closed when the ignition circuit is initially closed.

2. In combination in a motor vehicle including a motor, an ignition circuit for the motor, a lighting circuit, and interlocking control means between the two circuits to cause the lighting circuit to be closed when the ignition circuit is initially closed, said control means permitting independent control of the lighting circuit after the initial closing of the ignition circuit and so long as the ignition system remains closed.

3. In combination, in a motor vehicle including a motor, an ignition circuit and an ignition switch for the motor, a lighting circuit and a lighting circuit control switch for the lighting circuit in series electrical relation with the ignition switch, an auxiliary lighting control switch to manually open the lighting circuit while the ignition circuit is closed, and means to mechanically operate the auxiliary switch to close the lighting circuit when the ignition switch is opened.

4. In a motor vehicle, an ignition circuit, an ignition switch for controlling the ignition circuit, a lighting circuit, a lighting switch for controlling the lighting circuit, a solenoid energized from the lighting circuit, and means preventing closing of the ignition switch when the lighting circuit is open, said means being actuated by the solenoid to release the ignition switch for closing of the latter when the lighting circuit is closed.

5. In combination in an automobile including a motor, an ignition circuit for the motor, a lighting circuit, switches controlling the respective circuits, and connections between the switches compelling closing of the lighting switch incident to closing of the ignition switch while permitting operation of the lighting switch throughout the entire range of adjustment thereof and independently of the ignition switch when the latter is closed.

6. In combination in an automobile including a motor, an ignition circuit for the motor, a lighting circuit, switches controlling the respective circuits, and means interlocking the switches and compelling closing of the lighting switch incident to closing of the ignition switch while permitting operation of the lighting switch throughout the entire range of adjustment thereof and independently of the ignition switch when the latter is closed.

7. In combination in an automobile including a motor, an ignition circuit for the motor, a lighting circuit, switches controlling the respective circuits, and connections between the switches compelling closing of the lighting switch preliminary to closing of the ignition switch while permitting operation of the lighting switch throughout the entire range of adjustment thereof and independently of the ignition switch when the latter is closed.

8. In combination in an automobile including a motor, an ignition circuit for the motor, a lighting circuit, means for enabling and disabling the respective circuits, and means supplemental to the enabling and disabling means compelling enabling of the lighting circuit incident to enabling of the ignition circuit while permitting both enabling and disabling of the lighting circuit when the ignition circuit is enabled.

9. In combination in an automobile including a motor, an ignition circuit for the motor, a switch controlling said circuit, a lighting circuit, a switch controlling the lighting circuit and adjustable into several positions including an open position and a closed position, and means interlocking the switches and compelling closing of the lighting switch incident to closing of the ignition switch while permitting operation of the lighting switch throughout the entire range of adjustment thereof and independently of the ignition switch when the latter is closed.

10. In an automobile having an engine and adapted to be driven by the engine responsive to the establishment of predetermined driving conditions including an ignition circuit, a lighting circuit, and means for apprising an operator of the open condition of the lighting circuit upon an attempted initial establishment of the ignition circuit.

11. In an automobile having an engine and adapted to be driven by the engine and including an ignition circuit, a lighting circuit, means for apprising an operator of the open condition of the lighting circuit upon an attempted initial establishment of the ignition circuit, and means for disabling the apprising means responsive to establishment of said ignition circuit.

12. In an automobile having an engine and adapted to be driven by the engine responsive to the establishment of an ignition circuit, a lighting circuit, means for preventing the initial closing of said ignition circuit, and means responsive to the establishment of the lighting circuit for disabling said preventing means.

JAMES S. MANTON.